United States Patent [19]
DiEdwardo et al.

[11] Patent Number: 6,128,960
[45] Date of Patent: Oct. 10, 2000

[54] VIBRATION TESTING OF A POLE-MOUNTED COMMUNICATIONS NETWORK BASE STATION

[75] Inventors: Thomas A. DiEdwardo, Morris Plains; Philip B. Grimado; Lee S. Scafati, both of Denville, all of N.J.

[73] Assignee: Lucent Technologies Inc., Murray Hill, N.J.

[21] Appl. No.: 09/220,508

[22] Filed: Dec. 24, 1998

[51] Int. Cl.[7] .................................................. G01M 7/02
[52] U.S. Cl. ........................................................ 73/663
[58] Field of Search ............................. 73/662, 663, 666, 73/665, 664

[56] References Cited

U.S. PATENT DOCUMENTS 3,241,358  3/1966  Booth et al. ................................ 73/663
4,446,742  5/1984  Thompson, Jr. et al. ................. 73/663

FOREIGN PATENT DOCUMENTS 91537     3/1990   Japan ........................................ 73/663
1688144  10/1991   Russian Federation ................. 73/662

*Primary Examiner*—Hezron Williams
*Assistant Examiner*—Nashmiya Fayyaz
*Attorney, Agent, or Firm*—David L. Davis

[57] ABSTRACT

A test fixture for the vibration testing of pole-mounted apparatus includes a short length of pole hingedly supported on a vibration shake table, with the apparatus undergoing testing being secured to the pole. The end of the pole opposite its hinged mounting is coupled via a spring assembly to a rigid member secured to the shake table. Adjusting the spring constants "tunes" the response of the pole section to simulate a full size pole.

5 Claims, 3 Drawing Sheets

VIBRATION TESTING OF A POLE-MOUNTED COMMUNICATIONS NETWORK BASE STATION

BACKGROUND OF THE INVENTION

This invention relates to the vibration testing of a communications network base station and, more particularly, to such testing which simulates the pole mounting of such a station.

A cellular telephone base station is typically mounted out-of-doors on an elevated structure to increase its line-of-sight range. Recently, a smaller cell site, called a microcell, has been developed to cover "hot spots" and "dead spots". The microcell uses less power and provides fewer channels than a "normal" cell site and was designed for smaller coverage area. It is expected that the microcells will be installed in the field on existing wooden "telephone" poles about 90–95% of the time. To verify the adequacy of the design of the microcell for this predominant application, it is desirable to conduct vibration tests on a configuration that mimics, as closely as practical, the actual pole-mounted conditions.

It would be desirable to conduct such vibration tests indoors. However, a "typical" telephone pole is a forty feet tall pole having its lower six feet extending into the ground and with its upper end connected to cable support strands strung between adjacent poles, and it is very impractical to use a thirty foot or taller pole indoors. It would therefore be desirable to provide a vibration test fixture which simulates the response of a "typical" telephone pole to the type of vibrations to which it is expected to be subjected without requiring the use of a full size pole.

SUMMARY OF THE INVENTION

According to the present invention, there is provided a vibration test fixture for subjecting pole-mounted apparatus to vibration. The fixture includes a shake table having a mounting surface. A hinged support is mounted to the mounting surface and provides a pivot axis perpendicular to a direction of vibration and a length of pole has a first end hingedly secured about the pivot axis to the hinged support. A resilient assembly is coupled between a rigid member secured to the shake table and a point on the length of pole remote from the length of pole first end. The resilient assembly provides bidirectional elastic resistance to pivotal movement of the length of pole.

In accordance with an aspect of this invention, the rigid member comprises a vertical I-beam.

In accordance with another aspect of this invention, the resilient assembly includes four spring assemblies. Each spring assembly is located at a respective corner of a rectangle which is bisected by the plane defined by the central web of the I-beam.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
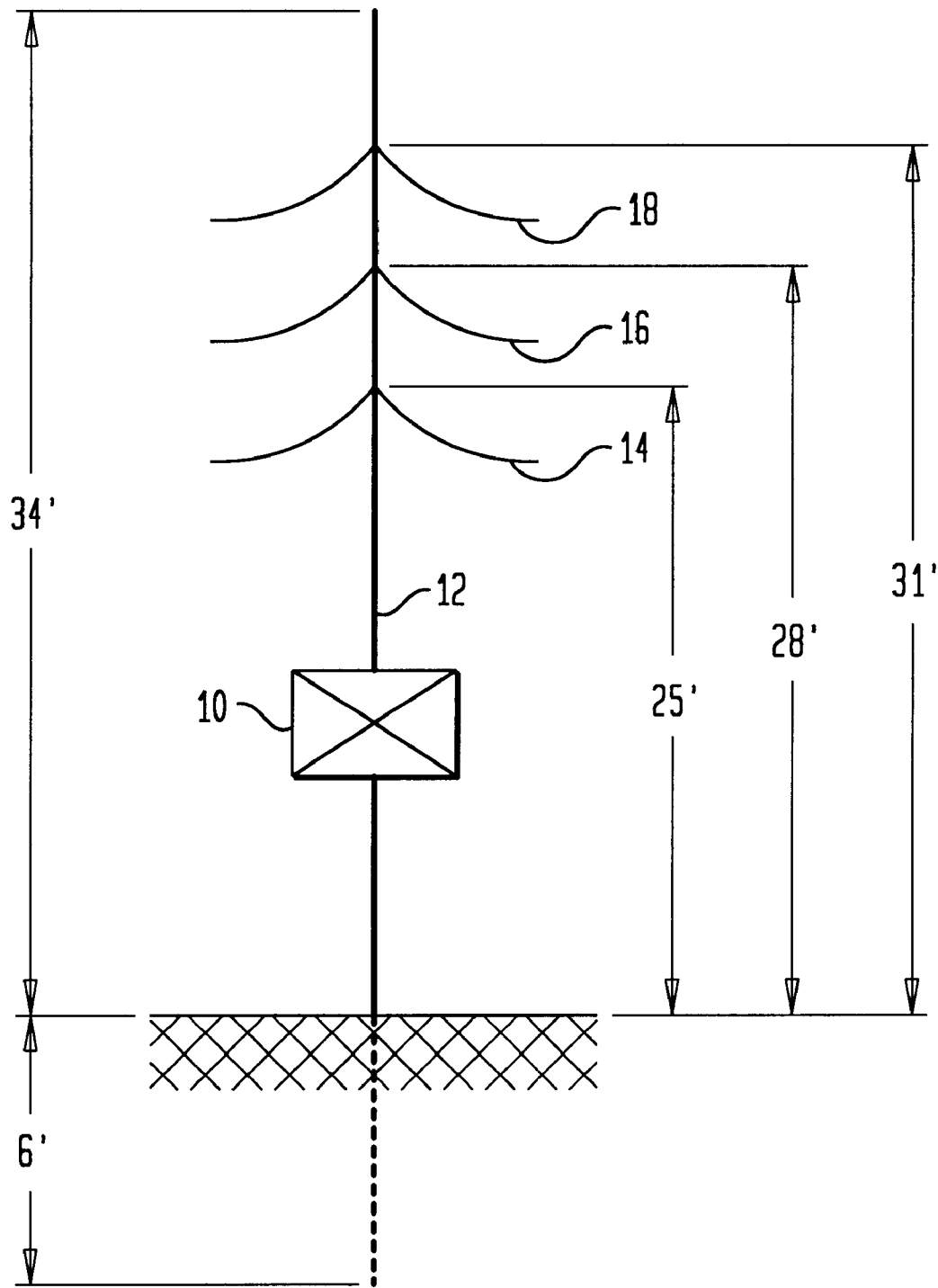
FIG. 1 is a schematic illustration of a standard installation of a microcell on a telephone pole.

FIG. 1 illustrates a typical mounting of a microcell 10 on a telephone pole 12. The pole 12 is usually a forty foot pole which is tapered so that its lower end is of greater diameter than its upper end. The pole 12 has its lower six feet buried underground and the microcell is typically mounted at an elevation in the range from approximately ten to approximately twenty feet above ground level. Near the upper end of the pole 12 are secured three cable support strands 14, 16, 18, typically at elevations of twenty-five feet, twenty-eight feet, thirty-one feet, respectively, above ground level. The cable support strands 14, 16, 18 hold the power, entertainment and communications cables which are strung between adjacent poles and also provide lateral stiffness to the pole 12, especially in the direction of the strands.

The degree of lateral stiffness provided by the strands 14, 16, 18 is directional—it depends on the direction that the pole 12 is moved. Therefore, the fundamental natural frequency of the pole 12 is also dependent on the direction of motion. The natural frequency of the pole 12 is an important characteristic, since the pole 12 furnishes a path through which seismic and other ground vibrations are transmitted to the microcell 10. The pole 12 can either magnify or dampen these ground excitations.

Studies have shown that for a seismic event, the bulk of the energy is contained in the frequency band from about 2 Hz to about 5 Hz. Unfortunately, studies have also determined that the natural frequency of the "typical" pole 12 lies in the range from about 2 Hz to about 10 Hz, and therefore it is likely that seismic ground motions will be amplified. Further studies have shown that the maximum ground acceleration of a Zone 4 earthquake is 1.32 G's. For microcell mounting heights in the range of ten to twenty feet, the peak acceleration occurs at the natural pole frequency of 3 Hz. The range of the peak acceleration is from about 2.00 G's to about 3.25 G's for these microcell placement locations. Accordingly, an objective of this invention is to amplify the input acceleration so that a peak acceleration at the microcell attachment point lies between the limits of 2.00 G's and 3.25 G's, in order to simulate the actual environment of the microcell for vibration testing purposes.

Figure 2:
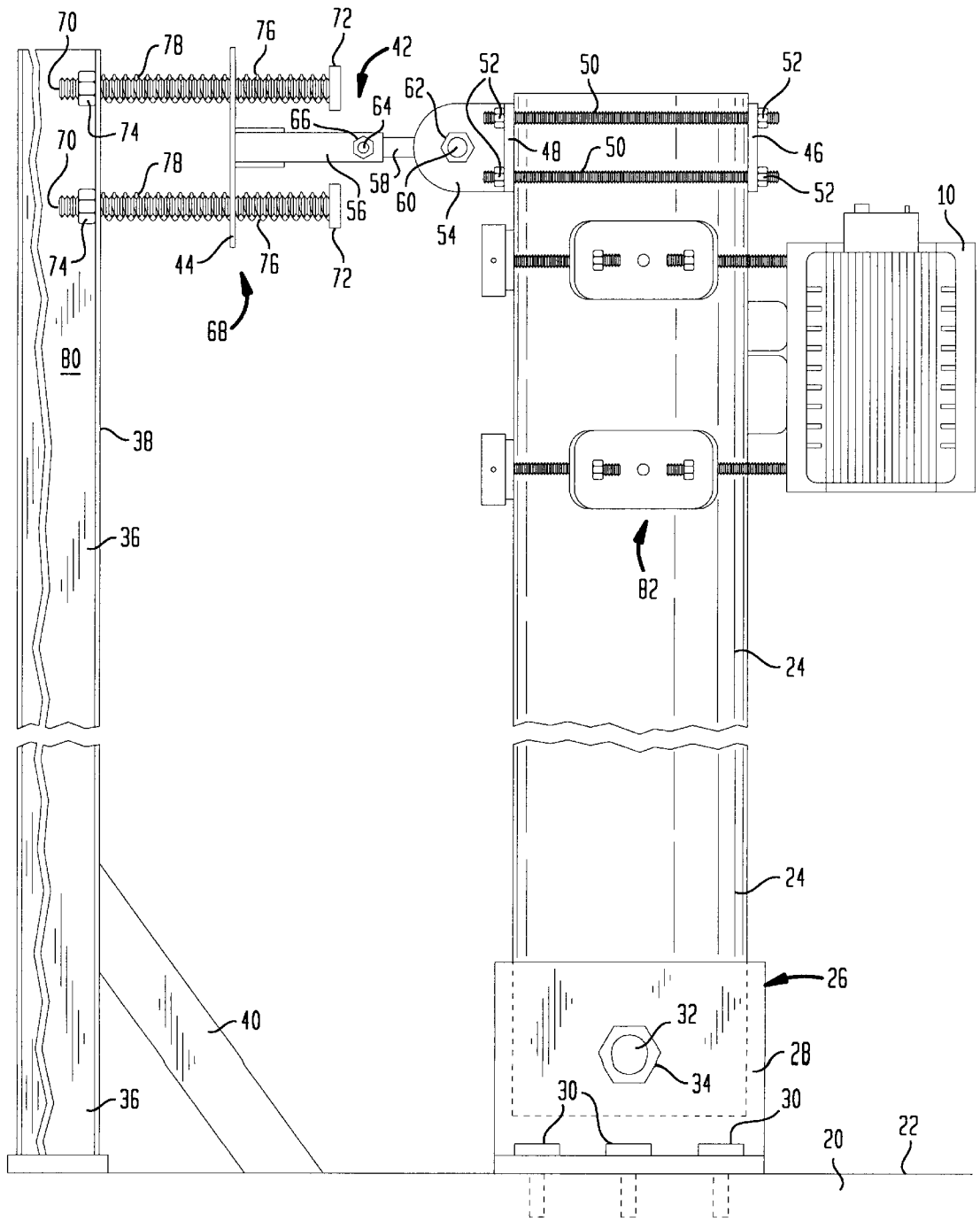
FIG. 2 is a side view of a test fixture constructed according to the present invention.
Figure 3:
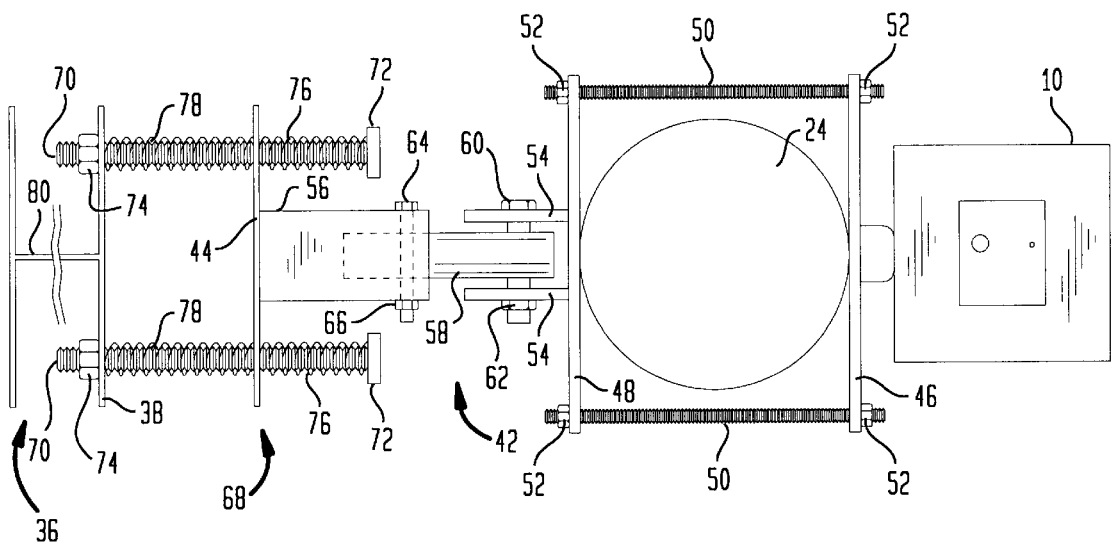
FIG. 3 is a top plan view of the test fixture shown in FIG. 2, showing how the length of pole is secured to the I-beam.

A vibration test fixture is a structure that provides an interface between a shake table and the apparatus under test. Since the inventive apparatus is used for vibration testing a pole-mounted microcell, a telephone pole would have to be incorporated into the test fixture such that the dynamic loads applied to the microcell and supporting hardware are at the same level which is expected when they are attached to an actual "typical" telephone pole. A vibration test fixture constructed according to the present invention is shown in FIGS. 2 and 3.

The inventive test fixture includes a shake table 20 with a horizontal top surface 22. A length of pole 24 is mounted to the table 20. Illustratively, the length of pole 24 is a seven foot section of an actual telephone pole. The length of pole 24 is secured at its lower end to the table 20 by a hinged support 26. Illustratively, the hinged support 26 includes a pair of parallel L-brackets 28 secured to the table 20 by bolts 30 or the like. Each of the L-brackets 28 is formed with a circular opening. The length of pole 24 has a circular through-hole drilled orthogonal to its axis near its lower end. The length of pole 24 is placed between the pair of L-brackets 28 and a bolt 32 is passed through the hole in one of the L-brackets 28, through the hole in the length of pole 24 and through the hole in the other one of the L-brackets 28, and is thereafter held in place by a nut 34. The bolt 32 provides a pivot axis for the length of pole 24 which is perpendicular to the direction in which vibration is imparted to the shake table 20.

Also mounted to the table 20 is an elongated rigid member 36, illustratively an eight foot aluminum I-beam. The I-beam 36 has a flange, or plate portion, 38 extending orthogonally to the top surface 22 of the table 20. The I-beam 36 is secured to the table top 22 as by welding and is held in place by one or more braces 40.

To secure the length of pole 24 to the I-beam 36, a bracket assembly 42 is secured at a first end to the length of pole 24 remote from the shake table 20. The bracket assembly 42 has a plate 44 at its end opposite where it is secured to the length of pole 24. To secure the bracket assembly 42 to the length of pole 24, a pair of plate members 46, 48 are situated on opposite sides of the length of pole 24 and are held together by bolts 50, illustratively four in number, extending through aligned holes through the plate members 46, 48. The bolts 50 are secured by nuts 52. The bracket assembly 42 includes a pair of spaced parallel tabs 54 secured to the plate member 48, as by welding or the like. A hollow tube 56 is secured to the plate 44 as by welding or the like, and a bar 58 extends within the interior of the tube 56 and between the tabs 54. The bar 58 is held to the tabs 54 by a bolt 60 and a nut 62 and is held to the tube 56 by a bolt 64 and a nut 66.

The bracket assembly 42 is held to the I-beam 36 by a resilient assembly which provides bidirectional elastic resistance to pivotal movement of the length of pole 24. Illustratively, this resilient assembly comprises the spring assembly 68. To accommodate the spring assembly 68, the flange 38 of the I-beam 36 is formed with four openings. The plate 44 of the bracket assembly 42 is likewise formed with four openings, each aligned horizontally and vertically with a respective one of the openings through the flange 38. A respective bolt 70 passes through each aligned pair of openings in the plate 44 and the flange 38. Illustratively, the head 72 of the bolt is toward the length of pole 24, and a nut 74 is threaded onto the end of the bolt 70 on the side of the flange 38 remote from the length of pole 24. The bolts 70 are aligned axially in the direction in which vibration is imparted to the shake table 20. Surrounding the bolt 70 between the plate 44 and the bolt head 72 is a first helical compression spring 76 and surrounding the bolt 70 between the plate 44 and the flange 38 is a second helical compression spring 78. Preferably, the holes through the flange 38 and the holes through the plate 44 are each located at a respective corner of a respective rectangle which is bisected by a plane defined by the central web 80 of the I-beam 36.

The microcell 10 is mounted to the length of pole 24 by conventional support structure hardware 82 normally used to mount the microcell 10 to a standard telephone pole 12.

Figure 4:
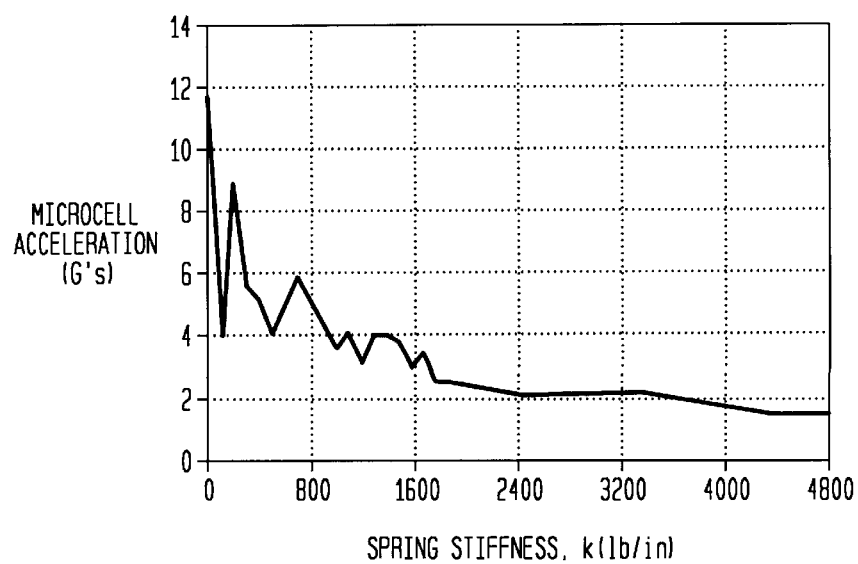
FIG. 4 is a graph which shows the microcell acceleration on the test fixture as a function of spring stiffness.

The springs 76, 78 provide a mechanism to "tune" the response of the length of pole 24 to produce the dynamic requirement expected in an actual pole-mounted installation. A finite element analysis of the described test fixture subjected to a Zone 4 earthquake was conducted. The maximum acceleration that the microcell 10 will experience when the center of the microcell is located at a height of fifty-two inches from the hinge bolt 32 is shown in FIG. 4 as a function of spring stiffness. To reproduce the expected response of an actual "typical" telephone pole shown in FIG. 1, the springs 76, 78 should have a stiffness (k) in the range from about 1800 pounds/inch to 4000 pounds/inch. The lower level of stiffness corresponds to the microcell 10 being located at relatively high elevations on the pole 12, whereas the upper limit of the stiffness would be valid for lower installation heights.

Other ways of "tuning" the response of the length of pole 24 include adjusting the position along the length of pole of the apparatus being tested and adding dead weights to the length of pole.

Although the hinged support 26 and the I-beam 38 are shown as being secured directly to the shake table 20, it may be desirable to secure these elements to a base plate which is then secured to the shake table. By so doing, removal of the base plate allows the shake table to be used for other tests.

Accordingly, there has been disclosed a fixture for vibration testing a pole-mounted communications network base station. While an illustrative embodiment of the present invention has been disclosed herein, it is understood that various modifications and adaptations to the disclosed embodiment are possible, and it is intended that this invention be limited only by the scope of the appended claims. Thus, other pole-mounted equipment can be tested, such as power transformers, for example.

What is claimed is:

1. A vibration test fixture for subjecting pole-mounted apparatus to vibration, comprising:

a shake table having a mounting surface;

a hinged support mounted to said mounting surface and providing a pivot axis perpendicular to a direction of vibration of the shake table mounting surface;

a length of pole having a first end hingedly secured about said pivot axis to said hinged support, wherein said apparatus is mountable to the pole; and a resilient assembly coupled between a rigid member secured to said shake table and a point on said length of pole remote from said length of pole first end, said resilient assembly providing bidirectional elastic resistance to pivotal movement of said length of pole.

2. A vibration test fixture for subjecting pole-mounted apparatus to vibration, comprising:

a shake table having a horizontal top surface;

a rigid member mounted to said table top surface, said rigid member having a plate portion extending orthogonally to said table top surface, said plate portion having a first opening therethrough remote from said table top surface;

a hinged support mounted to said table top surface and providing a pivot axis parallel to said plate portion;

a length of pole having a first end hingedly secured about said pivot axis to said hinged support, wherein said apparatus is mountable to the pole;

a bracket assembly secured at a first end to said length of pole remote from said length of pole first end, said bracket assembly having a plate at a second end remote from said bracket assembly first end, said plate extending generally parallel to said length of pole and having a second opening therethrough, with said bracket assembly being so located along said length of pole that said first and second openings are spaced from said table top surface substantially the same; and a spring assembly including:

a headed bolt extending through said first opening and said second opening;

a nut threaded on said bolt at the end remote from the head;

a first helical compression spring surrounding said bolt on a first side of said bracket assembly plate; and a second helical compression spring surrounding said bolt on a second side of said bracket assembly plate;

wherein said bolt is aligned axially in the direction in which vibration is imparted to the shake table.

3. The fixture according to claim 2 wherein said rigid member comprises a vertical I-beam having a pair of parallel flanges joined by a planar central web, said plate portion comprises a flange of said I-beam, and said I-beam is oriented with the plane of the central web of the I-beam parallel to the direction of vibration.

4. The fixture according to claim 3 wherein there are four spring assemblies located each at a respective corner of a rectangle which is bisected by a plane defined by the central web of the I-beam.

5. The fixture according to claim 2 further including support structure for mounting the apparatus to be tested to said length of pole above said hinged support.

* * * * *